(12) United States Patent
Barberis et al.

(10) Patent No.: US 8,576,977 B2
(45) Date of Patent: Nov. 5, 2013

(54) METHOD FOR DESIGNING A FUEL ASSEMBLY OPTIMIZED AS A FUNCTION OF THE STRESSES IN USE IN LIGHT-WATER NUCLEAR REACTORS, AND RESULTING FUEL ASSEMBLY

(75) Inventors: Pierre Barberis, Ugine (FR); Véronique Rebeyrolle, Duingt (FR); Jean-Jérôme Vermoyal, Chasselay (FR)

(73) Assignee: Areva NP, Courbevoie (FR)

( * ) Notice: Subject to any disclaimer, the term of this patent is extended or adjusted under 35 U.S.C. 154(b) by 961 days.

(21) Appl. No.: 12/448,157

(22) PCT Filed: Dec. 7, 2007

(86) PCT No.: PCT/FR2007/002018
§ 371 (c)(1),
(2), (4) Date: Dec. 14, 2009

(87) PCT Pub. No.: WO2008/090269
PCT Pub. Date: Jul. 31, 2008

(65) Prior Publication Data
US 2010/0091932 A1 Apr. 15, 2010

(30) Foreign Application Priority Data

Dec. 11, 2006 (FR) ...................................... 06 10785

(51) Int. Cl.
*G21C 3/04* (2006.01)
*G21C 3/06* (2006.01)
*G21C 21/02* (2006.01)
*G21C 3/00* (2006.01)
*G21C 21/00* (2006.01)

(52) U.S. Cl.
USPC ........... 376/434; 376/409; 376/412; 376/426; 976/DIG. 282; 976/DIG. 283

(58) Field of Classification Search
USPC ......... 376/409, 412, 414, 416, 417, 419, 426, 376/434, 438, 441, 442, 446, 449, 457; 148/95, 240, 281, 559, 668, 672, 400, 148/405, 407, 421; 420/422, 423; 976/DIG. 37, DIG. 38, DIG. 39, 976/DIG. 282, DIG. 283
See application file for complete search history.

(56) References Cited

U.S. PATENT DOCUMENTS 3,769,159 A * 10/1973 Zinn et al. ...................... 376/441
3,770,583 A * 11/1973 Klumb et al. .................. 376/449
(Continued)

FOREIGN PATENT DOCUMENTS

EP 0399223 A1 11/1990
EP 0533073 A1 * 3/1993
(Continued)

*Primary Examiner* — Bernarr Gregory
(74) *Attorney, Agent, or Firm* — Davidson, Davidson & Kappel, LLC

(57) ABSTRACT

A method for design of a fuel assembly for nuclear reactors, including structural components made from zirconium alloy: the mean uniaxial tensile or compressive stress to which the components are subjected during the assembly life is calculated, the zirconium alloy of which the components are made is selected according to the following criteria: those components subjected to an axial or transverse compressive stress of between −10 et −20 MPa are made from an alloy with a content of Sn between Sn=(−0.025σ−0.25)% and Sn=−0.05σ%: those components subjected to such a stress of between 0 et −10 MPa are made from an alloy the Sn content of which is between Sn=traces and Sn=(0.05σ+1)%: those components subjected to such a stress of between 0 and +10 MPa are made from an alloy the Sn content of which is between Sn=0.05% and Sn=(0.07σ+1)%: and those components subjected to such a stress of between +10 and +20 MPa are made from an alloy the content of SN of which is between 0.05% and 1.70%. A fuel assembly made according to the method.

8 Claims, 2 Drawing Sheets

(56) References Cited

U.S. PATENT DOCUMENTS

| | | | | |
|---|---|---|---|---|
| 3,791,466 A | * | 2/1974 | Patterson et al. | 376/441 |
| 3,963,534 A | * | 6/1976 | Frenkel et al. | 148/672 |
| 4,058,436 A | * | 11/1977 | Anthony | 376/449 |
| 4,197,145 A | * | 4/1980 | Hanneman et al. | 148/672 |
| 4,212,686 A | * | 7/1980 | Lunde et al. | 148/421 |
| 4,295,935 A | * | 10/1981 | Anthony | 376/442 |
| 4,418,036 A | * | 11/1983 | Gjertsen et al. | 376/449 |
| 4,584,030 A | * | 4/1986 | McDonald et al. | 148/281 |
| 4,655,990 A | * | 4/1987 | Leclercq | 376/446 |
| 4,678,632 A | * | 7/1987 | Ferrari | 376/441 |
| 4,707,330 A | * | 11/1987 | Ferrari | 376/457 |
| 4,717,434 A | * | 1/1988 | McDonald et al. | 148/407 |
| 4,879,093 A | * | 11/1989 | Garde | 148/421 |
| 4,986,957 A | * | 1/1991 | Taylor | 376/417 |
| 5,023,048 A | * | 6/1991 | Mardon et al. | 376/416 |
| 5,073,336 A | * | 12/1991 | Taylor | 376/416 |
| 5,130,083 A | * | 7/1992 | Johansson | 376/441 |
| 5,190,721 A | * | 3/1993 | Cheng | 376/417 |
| 5,245,645 A | * | 9/1993 | Steinberg | 376/416 |
| 5,267,284 A | * | 11/1993 | Grossman | 376/419 |
| 5,267,290 A | * | 11/1993 | Corsetti et al. | 376/419 |
| 5,278,882 A | * | 1/1994 | Garde et al. | 376/416 |
| 5,373,541 A | * | 12/1994 | Mardon et al. | 376/416 |
| 5,539,791 A | * | 7/1996 | Garzarolli et al. | 376/417 |
| 5,699,396 A | * | 12/1997 | Taylor | 376/416 |
| 5,832,050 A | | 11/1998 | Rebeyrolle et al. | |
| 5,835,550 A | * | 11/1998 | Van Swam et al. | 376/409 |
| 5,838,753 A | * | 11/1998 | Van Swam et al. | 376/412 |
| 5,844,959 A | * | 12/1998 | Van Swam et al. | 376/412 |
| 5,854,818 A | * | 12/1998 | Van Swam et al. | 376/409 |
| 5,972,288 A | | 10/1999 | Jeong et al. | |
| 6,744,842 B2 | * | 6/2004 | Schmidt et al. | 376/409 |
| 8,043,448 B2 | * | 10/2011 | White et al. | 148/672 |
| 2003/0053583 A1 | * | 3/2003 | Schmidt et al. | 376/434 |
| 2006/0177341 A1 | | 8/2006 | Jeong et al. | |

FOREIGN PATENT DOCUMENTS

| | | |
|---|---|---|
| EP | 0 802 264 A1 | 10/1997 |
| EP | 1688508 | 8/2006 |
| FR | 2769637 A1 | 4/1999 |
| JP | 10273746 A | 10/1998 |
| JP | 11286736 A | 10/1999 |

* cited by examiner

METHOD FOR DESIGNING A FUEL ASSEMBLY OPTIMIZED AS A FUNCTION OF THE STRESSES IN USE IN LIGHT-WATER NUCLEAR REACTORS, AND RESULTING FUEL ASSEMBLY

The invention relates to the design of fuel assemblies for light-water nuclear reactors.

BACKGROUND

In the core of a boiling water (BWR) or pressurized water (PWR) nuclear reactor, the fuel assembly components made of zirconium alloy are subjected to severe stresses which lead to their deformation. The main components affected are the mixer grids, the guide thimbles, the tubes containing the fuel pellets and the cans.

Deformation of the structural components of the assembly can cause numerous problems in use. For example, during operation, deformation of the assembly as a whole, caused essentially by deformation of the guide thimbles or of the can, can interfere with the operation of the control clusters which permit control of the reactor. Or, during operations of loading and unloading the reactor core, deformation of components such as the grids or the can increases friction and the risks of catching. This often leads the plant operator to reduce the handling speeds, thus increasing the time for which the reactor is not available. Likewise, beyond a certain threshold, deformation of the components means that they are no longer able to perform their functions completely safely and can lead the plant operator to unload the fuel assembly in question prematurely.

The stresses to which these components are subjected are substantially:
 temperature;
 mechanical stresses which are liable to cause creep of the components;
 corrosion by the water circulating in the reactor;
 hydriding;
 irradiation by the neutron flux, which leads to phenomena of enlargement (free growth) and intensifies corrosion.

The choices of the materials used to produce the structural components of the assembly and the size thereof must take into account all these stresses. Different grades of zirconium alloy have been developed for that purpose, but the choice of a material remains empirical, often resulting in the use of the same alloy for different components, such as the mixer grids and the guide thimbles (PWR) or the cans (BWR), even when they are not subjected to the same stresses.

SUMMARY OF THE INVENTION

An object of the invention is to propose a method by means of which the choice of the materials used to produce the various structural components of the fuel assembly can be optimised as a function of the specific operating conditions of the reactor or of the reactor family in question so as to minimize the total deformation of the components. The chemical composition of the Zr alloys used to produce the various structural components of the fuel assembly is therefore to be defined, allowing the performances expected by the plant operator in terms of manuverability, ease of use, lifetime, etc. to be achieved.

The present invention provides a method for designing a fuel assembly for a light-water nuclear reactor comprising structural components made of zirconium alloy, characterized in that:

the average uniaxial tensile or compressive stresses to which said components will be subjected during the lifetime of the assembly are calculated;
and the zirconium alloys from which said components will be produced are chosen according to the following criterion:
 components subjected to an axial or transverse compressive stress $\sigma$ of from $-10$ to $-20$ MPa will be produced from an alloy whose content of elements other than Zr does not exceed 5% and whose Sn content is from $Sn=(-0.025\cdot\sigma-0.25)\%$ to $Sn=-0.05\cdot\sigma\%$;
 components subjected to an axial or transverse compressive stress $\sigma$ of from 0 to $-10$ MPa will be produced from an alloy whose content of elements other than Zr does not exceed 5% and whose Sn content is from $Sn=$traces to $Sn=(0.05\cdot\sigma+1)\%$;
 components subjected to an axial or transverse tensile stress $\sigma$ of from 0 to $+10$ MPa will be produced from an alloy whose content of elements other than Zr does not exceed 5% and whose Sn content is from $Sn=0.05\cdot\sigma\%$ to $Sn=(0.07\cdot\sigma+1)\%$;
 components subjected to an axial or transverse tensile stress $\sigma$ of from $+10$ to $+20$ MPa will be produced from an alloy whose content of elements other than Zr does not exceed 5% and whose Sn content is from 0.05% to 1.70%.

The notation "X·$\sigma$" means "X*$\sigma$" where the $\sigma$ is the stress value indicated in front of the pressure units, for example 10 for 10 MPa.

Preferably:
 at least some of said components subjected to an axial or transverse tensile stress $\sigma$ of from 0 to $+10$ MPa will be produced from an alloy whose content of elements other than Zr does not exceed 5% and whose Sn content is from $Sn=0.05\cdot\sigma\%$ to $Sn=(0.025\cdot\sigma+1)\%$;
 at least some of said components subjected to an axial or transverse tensile stress $\sigma$ of from $+10$ to $+20$ MPa will be produced from an alloy whose content of elements other than Zr does not exceed 5% and whose Sn content is from 0.50% to 1.25%.

Preferably, said zirconium alloys from which said components will be produced are chosen according to the following criteria:
 for components that are in the wholly recrystallized state or that are recrystallized to the extent of more than 50%:
  components subjected to an axial or transverse compressive stress $\sigma$ of from $-10$ to $-20$ MPa will be produced from an alloy whose content of elements other than Zr does not exceed 5% and whose Sn content is from $Sn=(-0.025\cdot\sigma-0.25)\%$ to $Sn=(-0.05\cdot\sigma-0.25)\%$;
  components subjected to an axial or transverse compressive stress $\sigma$ of from 0 to $-10$ MPa will be produced from an alloy whose content of elements other than Zr does not exceed 5% and whose Sn content is from $Sn=$traces to $Sn=(0.025\cdot\sigma+0.5)\%$;
  components subjected to an axial or transverse tensile stress $\sigma$ of from 0 to $+10$ MPa will be produced from an alloy whose content of elements other than Zr does not exceed 5% and whose Sn content is from $Sn=0.05\cdot\sigma\%$ to $Sn=(0.12\cdot\sigma+0.5)\%$;
  components subjected to an axial or transverse tensile stress $\sigma$ of from $+10$ to $+20$ MPa will be produced from an alloy whose content of elements other than Zr does not exceed 5% and whose Sn content is from 0.50% to 1.70%;
 for components that are in the relaxed state or that are recrystallized to the extent of less than 50%:

components subjected to an axial or transverse compressive stress σ of from −10 to −20 MPa will be produced from an alloy whose content of elements other than Zr does not exceed 5% and whose Sn content is from Sn=(−0.05·σ−0.5)% to Sn=−0.05·σ%;

components subjected to an axial or transverse compressive stress σ of from 0 to −10 MPa will be produced from an alloy whose content of elements other than Zr does not exceed 5% and whose Sn content is from Sn=traces to Sn=(0.05·σ+1)%;

components subjected to an axial or transverse tensile stress σ of from 0 to +10 MPa will be produced from an alloy whose content of elements other than Zr does not exceed 5% and whose Sn content is from Sn=0.075·σ% to Sn=(0.07·σ+1)%;

components subjected to an axial or transverse tensile stress σ of from 10 to 20 MPa will be produced from an alloy whose content of elements other than Zr does not exceed 5% and whose Sn content is from 0.75% to 1.70%.

Preferably:

for components that are in the wholly recrystallized state or that are recrystallized to the extent of more than 50%:

at least some of said components subjected to an axial or transverse tensile stress σ of from 0 to +10 MPa will be produced from an alloy whose content of elements other than Zr does not exceed 5% and whose Sn content is from Sn=0.05·σ% to Sn=(0.075·σ+0.5)%;

at least some of said components subjected to an axial or transverse tensile stress σ of from +10 to +20 MPa will be produced from an alloy whose content of elements other than Zr does not exceed 5% and whose Sn content is from 0.50 to 1.25%;

for components that are in the relaxed state or that are recrystallized to the extent of less than 50%:

at least some of said components subjected to an axial or transverse tensile stress σ of from 0 to +10 MPa will be produced from an alloy whose content of elements other than Zr does not exceed 5% and whose Sn content is from Sn=0.075·σ% to Sn=(0.025·σ+1.0)%;

at least some of said components subjected to an axial or transverse tensile stress σ of from +10 to +20 MPa will be produced from an alloy whose content of elements other than Zr does not exceed 5% and whose Sn content is from 0.75% to 1.25%.

Preferably:

for components that are in the wholly recrystallized state or that are recrystallized to the extent of more than 50%:

at least some of the components subjected to an axial or transverse compressive stress σ of from −10 to −20 MPa will be produced from an alloy whose content of elements other than Zr does not exceed 5% and whose Sn content is equal to Sn=(−0.05·σ−0.5)% or differs from the value so calculated by ±20% thereof;

at least some of the components subjected to an axial or transverse compressive stress σ of from 0 to −10 MPa will be produced from an alloy whose content of elements other than Zr does not exceed 5% and whose Sn content is 0.15%;

at least some the components subjected to an axial or transverse tensile stress σ of from 0 to +10 MPa will be produced from an alloy whose content of elements other than Zr does not exceed 5% and whose Sn content is equal to Sn=0.1·σ% or differs from the value so calculated by ±20% thereof;

at least some of the components subjected to an axial or transverse tensile stress σ of from +10 to +20 MPa will be produced from an alloy whose content of elements other than Zr does not exceed 5% and whose Sn content is equal to 1%±0.2%;

for components that are in the relaxed state or that are recrystallized to the extent of less than 50%:

at least some of the components subjected to an axial or transverse compressive stress σ of from −10 to −20 MPa will be produced from an alloy whose content of elements other than Zr does not exceed 5% and whose Sn content is equal to Sn=(−0.05·σ−0.25)% or differs from the value so calculated by ±20% thereof;

at least some of the components subjected to an axial or transverse compressive stress σ of from 0 to −10 MPa will be produced from an alloy whose content of elements other than Zr does not exceed 5% and whose Sn content is equal to −0.025·σ% or differs from the value so calculated by ±20% thereof;

at least some of the components subjected to an axial or transverse tensile stress σ of from 0 to +10 MPa will be produced from an alloy whose content of elements other than Zr does not exceed 5% and whose Sn content is equal to Sn=0.1·σ% or differs from the value so calculated by ±20% thereof;

at least some of the components subjected to an axial or transverse tensile stress σ of from +10 to +20 MPa will be produced from an alloy whose content of elements other than Zr does not exceed 5% and whose Sn content is equal to 1%±0.2%;

when said calculated values of the Sn content are less than 0.1%, 0.15% is taken as the upper limit of the Sn content.

Preferably, at least some of said components have a total content of elements other than Zr that does not exceed 3.5%.

At least some of said components can have an Nb content of from 0.5 to 3%.

At least some of said components can have an Nb content of from 0.5 to 3% and also contain Fe and/or Cr and/or Cu and/or V and/or Ni, where Fe+Cr+Ni+Cu+V=from 0.03 to 0.5%.

The invention relates also to a fuel assembly for a light-water nuclear reactor comprising components made of Zr alloy which may be subjected to axial or transverse compressive or tensile stresses σ, characterized in that said components are produced from alloys chosen by applying the above method.

As will have been understood, the invention is based on the initial reasoning according to which the Sn content of the alloy from which a component is produced has a marked influence on its properties, and the choice of that content should be made as a function of the thermal, mechanical and physico-chemical stresses to which the component is bound to be subjected during use of the reactor, optimally while also taking into account the more or less recrystallized or relaxed state of the component.

BRIEF DESCRIPTION OF THE DRAWINGS

The invention will be better understood upon reading the description which follows, which refers to the following accompanying figures.

DETAILED DESCRIPTION

The comments made hereinbelow apply to Zr alloys whose content of alloying elements other than Zr does not exceed 5%, preferably does not exceed 3.5%.

The Sn content of a Zr alloy has a marked influence both on its corrosion behaviour and on its creep resistance, which is one of the most important mechanical characteristics to consider when assessing the behaviour of a component.

The invention is based on the concept according to which the Sn content of the various components of a reactor should be optimized so that the component undergoes little corrosion and is subject to little deformation under the precise conditions in which it will be used. This optimization should subsequently be refined by the choice of the contents of other elements, especially of O and S, which have a considerable influence on the creep, and of Fe, which has a considerable influence on corrosion. However, Sn, which has a considerable influence on both those factors, is the most important element to be considered when it is desired to obtain a good compromise between these various, sometimes contradictory, requirements.

In order to reach their conclusions, the inventors produced a model of the creep behaviour of Zr alloys containing not more than 5% of elements other than Zr, as a function:

of the uniaxial compressive or tensile stress $\sigma$ applied to the component in question, in the range from $-20$ MPa to $+20$ MPa, averaged over the lifetime of the assembly;

and of the Sn content of the alloy constituting the component, as well as its recrystallized or relaxed state.

The range of stresses considered broadly covers the uniaxial stresses encountered in a reactor. Beyond 20 MPa, the stress would lead to redhibitory creep of the components.

During these simulations, the inventors also took into account the influence of temperature and the physico-chemical use conditions of the alloys in the conventional reactor environments. In particular, the enlargement under irradiation caused by the neutron flux was taken into account, and the stresses caused by the formation of the oxide layer following corrosion of the material. Hydriding, which causes an enlargement of the material, and friction of the fluid on the assembly were also taken into account.

Regarding the temperatures to which the components are subjected, they were considered as being typically from 280 to 360° C. for a pressurized water reactor and from 280 to 300° C. for a boiling water reactor.

Figure 1:
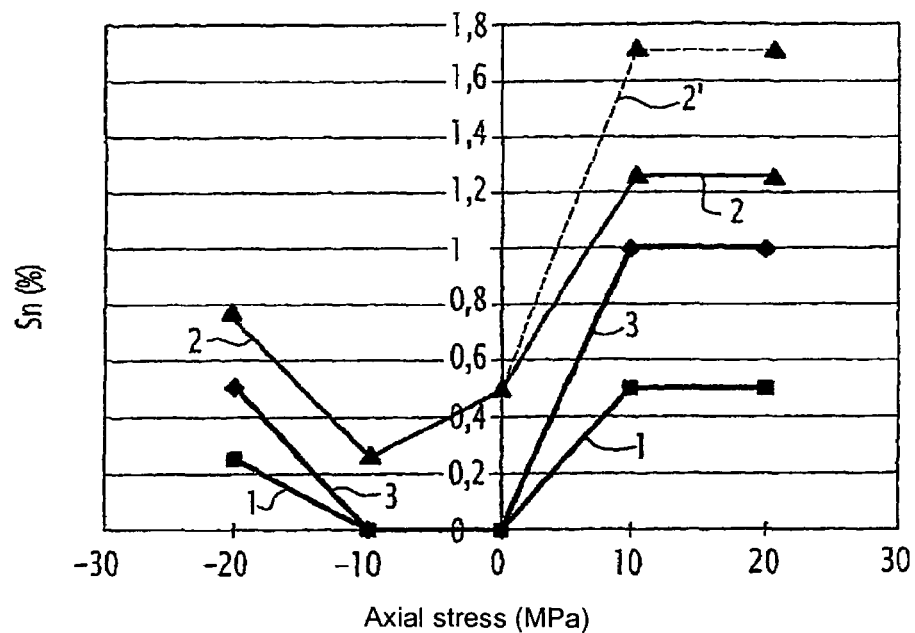
FIG. 1, which shows the minimum, maximum and preferred Sn contents which, according to the invention, are applied to the components of the fuel assembly as a function of the axial tensile or compressive stress to which they are subjected, in the case where the alloy is in the recrystallized state.
Figure 2:
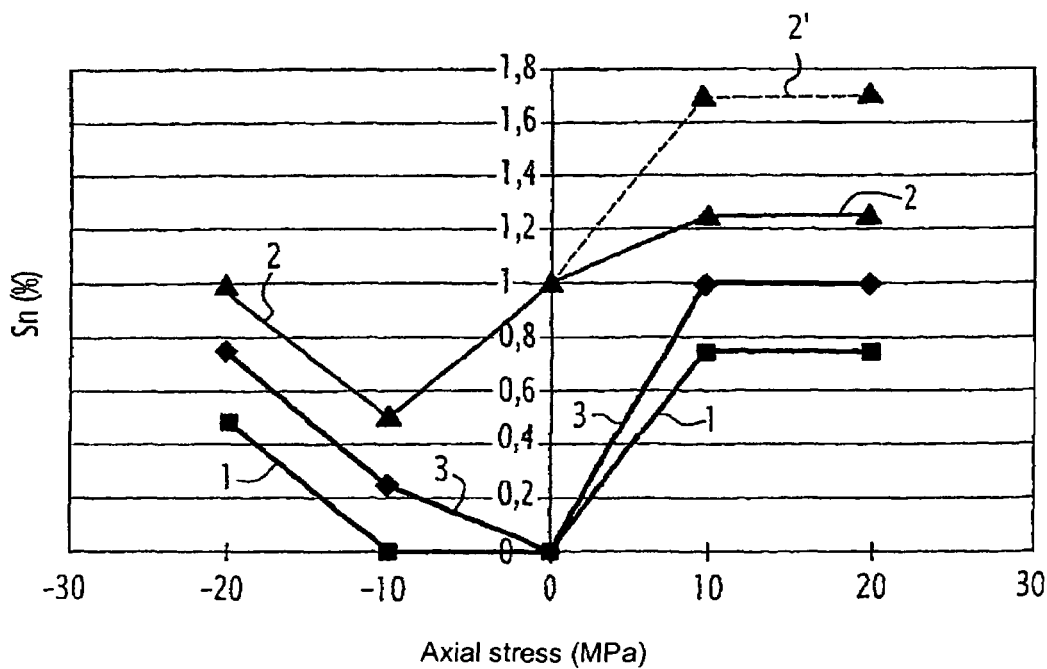
FIG. 2, which shows the minimum, maximum and preferred Sn contents which, according to the invention, are applied to the components of the fuel assembly as a function of the axial tensile or compressive stress to which they are subjected, in the case where the alloy is in the relaxed state.
Figure 3:
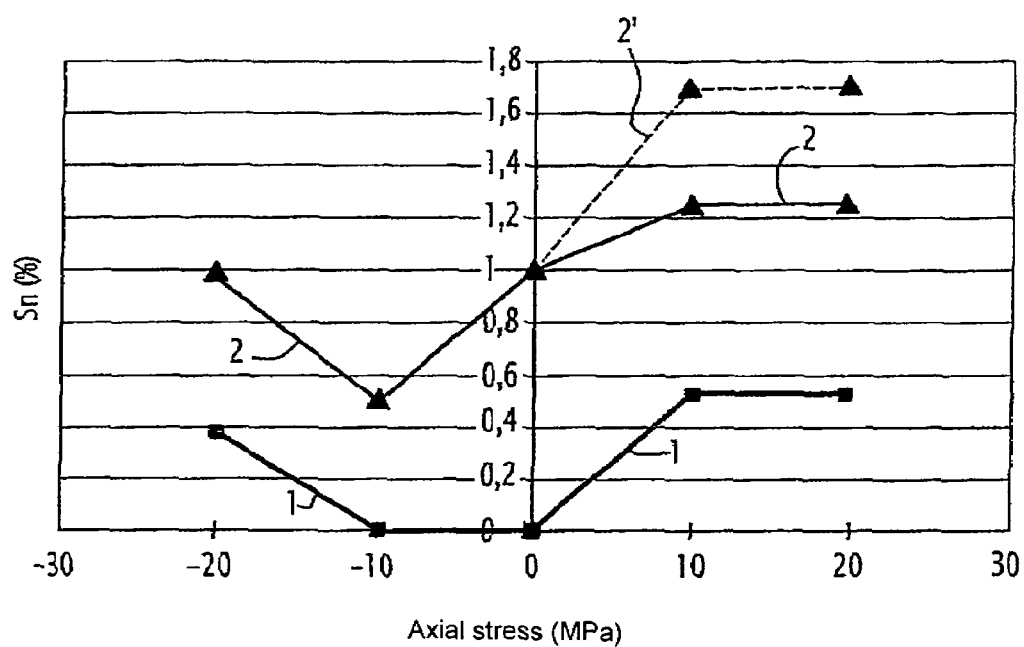
FIG. 3, which shows the minimum and maximum Sn contents which, according to the invention, are applied to the components of the fuel assembly as a function of the axial tensile or compressive stress to which they are subjected, in the most general case.

The conclusions are summarized by FIGS. 1 to 3, which show the recommended Sn content to be applied, according to the invention, to a fuel assembly component as a function of the tensile stress (positive values) or compressive stress (negative values) to which it is subjected when the reactor is operating in its nominal use conditions.

In particular, FIG. 1 relates to alloys that are in the wholly recrystallized state, and FIG. 2 relates to alloys that are in the relaxed state.

In these figures, the curves denoted 1 correspond to the minimum Sn contents to be applied according to the invention. The curves 2 correspond to the maximum Sn contents to be applied according to the invention when high resistance of the component to corrosion and to hydriding is sought; the curves 2' correspond to a variation of the curves 2 corresponding to the case where high resistance of the component to corrosion and hydriding is not particularly sought. The curves 3 correspond to the Sn contents that are considered optimum.

Within the perspective of the invention, the inventors think that it is generally preferable to apply to the alloys used an Sn content of not more than 1.25% because, beyond that content, the corrosion and hydriding become too rapid for some use conditions. It is possible, however, to include in the fuel assembly according to the invention components with Sn≤1.25% in the areas that are most exposed to corrosion and hydriding, and components with Sn≥1.25% in the areas that are least exposed to corrosion and hydriding. 1.70% Sn appears to be the content that is not to be exceeded in any case. Likewise, it would remain within the scope of the invention to use conjointly in the assembly elements whose composition has been chosen according to the optimum criteria which are to be defined, and elements which comply not with those optimum criteria but with less demanding criteria that are also within the scope of the invention.

The uniaxial stress in question can be a longitudinal (axial) compressive or tensile stress, as is the case with the guide thimbles, tubes and cans, or a transverse compressive or tensile stress, as in the case of the grids.

With regard to alloys in the wholly recrystallized state (FIG. 1), the preferred selection criteria are as follows, applied to alloys whose total content of elements other than Zr does not exceed 5%, preferably 3.5%.

When the component is subjected to an axial or transverse compressive stress $\sigma$ of from $-10$ to $-20$ MPa, the Sn content is from Sn=$(-0.025 \cdot \sigma - 0.25)$% to Sn=$(-0.05 \cdot \sigma - 0.25)$%. Optimally, it is equal to Sn=$(-0.05 \cdot \sigma - 0.5)$% or differs from the value so defined by ±20% thereof. If the value found by calculating the Sn content is less than 0.10%, 0.15% is taken as the optimum upper limit of the Sn content.

When the component is subjected to an axial or transverse compressive stress $\sigma$ of from $-10$ to 0 MPa, the Sn content is from traces to Sn=$(0.025 \cdot \sigma \cdot \sigma + 0.5)$%. Optimally, Sn≤0.15%.

When the component is subjected to an axial or transverse tensile stress $\sigma$ of from 0 to $+10$ MPa, the Sn content is from Sn=$0.05 \cdot \sigma$% to Sn=$(0.12 \cdot \sigma + 0.5)$% when high corrosion resistance is not particularly sought, or from Sn=$0.05 \cdot \sigma$% to Sn=$(0.075 \cdot \sigma + 0.5)$% when high corrosion resistance is sought. Optimally, it is equal to $0.1 \cdot \sigma$% or differs from the value so calculated by ±20% thereof. If the calculated value is less than 0.1%, 0.15% is taken as the optimum upper limit of the Sn content.

When the component is subjected to an axial or transverse tensile stress $\sigma$ of from $+10$ to $+20$ MPa, the Sn content is from 0.50% to 1.70% when high corrosion resistance is not particularly sought, or from 0.50 to 1.25% when high corrosion resistance is sought. Optimally, it is equal to 1%±0.2%.

With regard to alloys in the relaxed state (FIG. 2), the preferred selection criteria are as follows, applied to alloys whose total content of elements other than Zr does not exceed 5%, preferably does not exceed 3.5%.

When the component is subjected to an axial or transverse compressive stress $\sigma$ of from ±10 to ±20 MPa, the Sn content is from Sn=$(-0.05 \cdot \sigma - 0.5)$% to Sn=$-0.05 \cdot \sigma$%. Optimally, it is equal to Sn=$(-0.05 \cdot \sigma - 0.25)$% or differs from the value so defined by ±20% thereof.

When the component is subjected to an axial or transverse compressive stress $\sigma$ of from $-10$ to 0 MPa, the Sn content is from Sn=traces to Sn=$(0.05 \cdot \sigma + 1)$%. Optimally, it is equal to Sn=$-0.025 \cdot \sigma$% or differs from the value so defined by ±20% thereof. If the value found by this calculation is less than 0.1%, 0.15% is taken as the optimum upper limit of the Sn content.

When the component is subjected to an axial or transverse tensile stress σ of from 0 to +10 MPa, the Sn content is from Sn=0.075·σ% to Sn=(0.07·σ+1)% when high corrosion resistance is not particularly sought, and from Sn=0.075·σ% to Sn=(0.025·σ+1)% when high corrosion resistance is sought. Optimally, it is equal to Sn=0.1·σ% or differs from that value by ±20% thereof. If the calculated value is less than 0.1%, 0.15% is taken as the optimum upper limit of the Sn content.

When the component is subjected to an axial or transverse tensile stress σ of from +10 to +20 MPa, the Sn content is from 0.75 to 1.70% if high corrosion resistance is not particularly sought, or from 0.75% to 1.25% if high corrosion resistance is sought. Optimally, the Sn content is equal to 1%±0.2%.

When the alloy is in a partially recrystallized state, it is possible to confer thereon, for a given axial compressive or tensile stress, an intermediate value between that defined as above for a wholly recrystallized alloy and that defined for an alloy in the relaxed state. As a first approximation, an alloy that is recrystallized to the extent of more than 50% can be likened to a wholly recrystallized alloy, and an alloy that is recrystallized to the extent of less than 50% can be likened to a relaxed alloy.

In that manner, by combining the above two preferred ranges, it is concluded that, according to the broadest definition of the invention, it is possible to define the choice of the Sn content of the components according to the following criteria, as is shown by FIG. 3.

For components subjected to an axial or transverse compressive stress σ of from −20 to −10 MPa, the Sn content is from Sn=(−0.025·σ−0.25)% (curve 1 of FIG. 1) to Sn=−0.05·σ% (curve 2 of FIG. 2).

For components subjected to an axial or transverse compressive stress σ of from −10 to 0 MPa, the Sn content is from Sn=traces (curve 1 of FIG. 1) to Sn=(0.05·σ+1)% (curve 2 of FIG. 2).

For components subjected to an axial or transverse tensile stress σ of from 0 to +10 MPa, the Sn content is from Sn=0.05·σ% (curve 1 of FIG. 1) to Sn=(0.07·σ+1)% (curve 2' of FIG. 2) when high corrosion resistance of the component is not particularly sought, or from Sn=0.05·σ% (curve 1 of FIG. 1) to Sn=(0.025·σ+1)% (curve 2 of FIG. 2) when high corrosion resistance of the component is sought.

For components subjected to an axial or transverse tensile stress σ of from +10 to +20 MPa, the Sn content is from 0.50% (curve 1 of FIG. 1) to 1.70% (curve 2' of FIG. 2) when high corrosion resistance of the component is not particularly sought, and from 0.50% (curve 1 of FIG. 1) to 1.25% (curve 2 of FIG. 2) when high corrosion resistance of the component is sought.

Accordingly, in all cases, in the absence of uniaxial axial or transverse tensile or compressive stress, the optimum Sn content is not more than 0.15% and can be as low as simple traces as impurities resulting from the preparation of the alloy.

In general, the optimum Sn content is higher in the relaxed states than in the recrystallized states owing to the higher rate of creep.

As has been stated, the invention is applicable to Zr alloys containing up to 5% (better, up to 3.5%) of alloying elements other than Zr. In particular, alloys containing from 0.5 to 3% Nb are preferred examples thereof, as are alloys containing from 0.5 to 3% Nb and also Fe and/or Cr and/or Cu and/or V and/or Ni, where Fe+Cr+Ni+Cu+V=from 0.03 to 0.5%. The fuel assembly produced according to the invention can use conjointly structural components that correspond to one or other of the composition criteria according to the invention.

What is claimed is:

1. A method for making a fuel assembly for a light-water nuclear reactor comprising structural components made of zirconium alloy, comprising the following steps:

calculating average uniaxial tensile or compressive stresses to which the components will be subjected during the lifetime of the assembly;

based on the calculating step, making components to be subjected to an axial or transverse compressive stress a of from −10 to −20 MPa to include an alloy comprising, in percentages by weight, Zr content of at least 95% and Sn content from Sn=(−0.025·σ−0.25) % to Sn=−0.05·σ%;

based on the calculating step, making components to be subjected to an axial or transverse compressive stress σ of from 0 to −10 MPa to include an alloy comprising, in percentages by weight, Zr content of at least 95% and Sn content from Sn=traces to Sn=(0.05·σ+1) %;

based on the calculating step, making components to be subjected to an axial or transverse tensile stress a of from 0 to +10 MPa to include an alloy comprising, in percentages by weight, Zr content of at least 95% and Sn content from Sn=0.05·σ% to Sn=(0.07·σ+1) %; and based on the calculating step, making components to be subjected to an axial or transverse tensile stress σ of from +10 to +20 MPa to include an alloy comprising, in percentages by weight, Zr content of at least 95% and Sn content from 0.05% to 1.70%.

2. The method according to claim 1 wherein the alloy of at least some of the components to be subjected to the axial or transverse tensile stress σ of from 0 to +10 MPa includes Sn content from Sn=0.05·σ% to Sn=(0.025·σ+1) %; and the alloy of at least some of the components to be subjected to the axial or transverse tensile stress σ of from +10 to +20 MPa includes Sn content from 0.50% to 1.25%.

3. The method according to claim 1 wherein for the components that are in the wholly recrystallized state or that are at least 50% recrystallized:

the alloy of the components to be subjected to an axial or transverse compressive stress σ of from −10 to −20 MPa includes Sn content from Sn=(−0.025·σ−0.25) % to Sn=−0.05·σ−0.25) %;

the alloy of the components to be subjected to an axial or transverse compressive stress σ of from 0 to −10 MPa includes Sn content from Sn=traces to Sn=(0.025·σ+0.5) %;

the alloy of the components to be subjected to an axial or transverse tensile stress σ of from 0 to +10 MPa includes Sn content from Sn=0.05·σ% to Sn=(0.12·σ+0.5) %;

the alloy of the components to be subjected to an axial or transverse tensile stress σ of from +10 to +20 MPa includes Sn content from 0.50% to 1.70%;

wherein for the components that are in the relaxed state or that are less than 50% recrystallized:

the alloy of the components to be subjected to an axial or transverse compressive stress σ of from −10 to −20 MPa includes Sn content from Sn=(−0.05·σ−0.5) % to Sn=−0.05·σ%;

the alloy of the components to be subjected to an axial or transverse compressive stress σ of from 0 to −10 MPa includes Sn content from Sn=traces to Sn=(0.05·σ+1) %;

the alloy of the components to be subjected to an axial or transverse tensile stress σ of from 0 to +10 MPa includes Sn content from Sn=0.075·σ% to Sn=(0.07·σ+1) %;

the alloy of the components to be subjected to an axial or transverse tensile stress σ of from 10 to 20 MPa includes Sn content from 0.75% to 1.70%.

4. The method according to claim 3 wherein for the components that are in the wholly recrystallized state or are recrystallized to the extent of more than 50%:

the alloy of at least some of the components to be subjected to an axial or transverse tensile stress σ of from 0 to +10 MPa includes Sn content from Sn=0.05·σ% to Sn=(0.075·σ+0.5) %;

the alloy of at least some of the components to be subjected to an axial or transverse tensile stress σ of from +10 to +20 MPa includes Sn content from 0.50 to 1.25%;

wherein for the components in the relaxed state or less than 50% recrystallized:

the alloy of at least some of the components to be subjected to an axial or transverse tensile stress σ of from 0 to +10 MPa includes Sn content from Sn=0.075·σ% to Sn=(0.025·σ+1.0) %;

the alloy of at least some of the components to be subjected to an axial or transverse tensile stress σ of from +10 to +20 MPa includes Sn content from 0.75% to 1.25%.

5. The method according to claim 4 wherein for the components in the wholly recrystallized state or at least 50% recrystallized:

the alloy of at least some of the components to be subjected to an axial or transverse compressive stress σ of from −10 to −20 MPa includes Sn content that is equal to a calculated value of Sn=(−0.05·σ−0.5) % or differs from the calculated value by ±20% thereof;

the alloy of at least some of the components to be subjected to an axial or transverse compressive stress σ of from 0 to −10 MPa includes Sn content that is ≤0.15%;

the alloy of at least some of the components to be subjected to an axial or transverse tensile stress σ of from 0 to +10 MPa includes Sn that is equal to a calculated value of Sn=0.1·σ% or differs from the calculated value by ±20% thereof;

the alloy of at least some of the components to be subjected to an axial or transverse tensile stress σ of from +10 to +20 MPa includes Sn content that is equal to 1%±0.2%;

wherein for components in the relaxed state or less than 50% recrystallized:

the alloy of at least some of the components to be subjected to an axial or transverse compressive stress σ of from −10 to −20 MPa includes Sn content that is equal to a calculated value of Sn=(−0.05·σ−0.25) % or differs from the calculated value by ±20% thereof;

the alloy of at least some of the components to be subjected to an axial or transverse compressive stress σ of from 0 to −10 MPa includes Sn content that is equal to a calculated value of Sn=−0.025·σ% or differs from the calculated value by ±20% thereof;

the alloy of at least some of the components to be subjected to an axial or transverse tensile stress σ of from 0 to +10 MPa includes Sn content that is equal to a calculated value of Sn=0.1·σ% or differs from the calculated value by ±20% thereof;

the alloy of at least some of the components to be subjected to an axial or transverse tensile stress σ of from +10 to +20 MPa includes Sn content that is equal to 1%±0.2%;

wherein when the calculated values of the Sn content are from 0% to 0.1%, the Sn content is from 0 to 0.15%.

6. The method according to claim 1 wherein at least some of the components include, in percentages by weight, at least 96.5% Zr.

7. The method according to claim 1 wherein at least some of the components include, in percentages by weight, Nb of from 0.5 to 3%.

8. The method according to claim 7 wherein at least some of the components include, in percentages by weight, Nb of from 0.5 to 3% and also include, in percentages by weight, at least one of Fe, Cr, Cu, V and Ni, where Fe+Cr+Ni+Cu+V=0.03 to 0.5%.

* * * * *